US009586325B2

(12) United States Patent
Truyens

(10) Patent No.: US 9,586,325 B2
(45) Date of Patent: Mar. 7, 2017

(54) PICK-AND-PLACE HEAD AND METHOD FOR PICKING WORK-PIECES

(71) Applicant: KLA-Tencor Corporation, Milipitas, CA (US)

(72) Inventor: Carl Truyens, Rotselaar (BE)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/594,810

(22) Filed: Jan. 12, 2015

(65) Prior Publication Data

US 2015/0147141 A1 May 28, 2015

Related U.S. Application Data

(63) Continuation of application No. PCT/US2014/064841, filed on Nov. 10, 2014.
(Continued)

(51) Int. Cl.
*B25J 15/06* (2006.01)
*B25J 15/00* (2006.01)
*B65G 47/91* (2006.01)

(52) U.S. Cl.
CPC ....... *B25J 15/0616* (2013.01); *B25J 15/0052* (2013.01); *B65G 47/917* (2013.01); *B65G 47/918* (2013.01)

(58) Field of Classification Search
CPC ..... B23Q 2703/04; B25J 9/0096; B25J 15/06; B25J 15/0616; B25J 15/0625;
(Continued)

(56) References Cited

U.S. PATENT DOCUMENTS 4,744,595 A * 5/1988 Tonning ................ B66C 1/0243
294/65
5,953,812 A * 9/1999 Ferrante ............. H05K 13/0413
29/407.04
(Continued)

FOREIGN PATENT DOCUMENTS

CN 101103452 A 1/2008
EP 1803665 A1 7/2007
(Continued)

*Primary Examiner* — Michael McCullough
*Assistant Examiner* — Brendan Tighe
(74) *Attorney, Agent, or Firm* — Simpson & Simpson, PLLC

(57) ABSTRACT

A pick-and-place head for picking a plurality of work-pieces from at least one first location and for placing the plurality of work-pieces at least one second location is disclosed. The pick-and-place head exhibits a plurality of nozzles, wherein each nozzle is configured to engage one of the work-pieces by action of a vacuum. At least one nozzle has an individual vacuum supply and at least two further nozzles have a shared vacuum supply. A corresponding method is also disclosed, the method including the steps of approaching at least one of the plurality of work-pieces with a respective nozzle and then starting generation of a vacuum at each respective nozzle. The generation of vacuum in at least one nozzle is achieved by an individual vacuum supply, and generation of vacuum in at least two further nozzles is achieved by a shared vacuum supply of the at least two further nozzles.

33 Claims, 5 Drawing Sheets

Related U.S. Application Data

(60) Provisional application No. 61/909,184, filed on Nov. 26, 2013.

(58) Field of Classification Search
CPC .... B25J 15/0683; B65G 47/91; B65G 47/912; B65G 47/914; B65G 47/917; B65G 47/918; B65G 49/061; B65G 2249/04; B65G 2249/045; H01L 21/6838
USPC ..... 294/183, 186, 188, 213; 414/737, 752.1, 414/806; 901/40
See application file for complete search history.

(56) References Cited

U.S. PATENT DOCUMENTS

| | | |
|---|---|---|
| 6,773,543 B2 | 8/2004 | Summers |
| 2004/0094979 A1 | 5/2004 | Damhuis |
| 2005/0200142 A1 | 9/2005 | Isetani et al. |
| 2007/0190200 A1* | 8/2007 | Cherala ................. B82Y 10/00 425/385 |
| 2008/0074118 A1 | 3/2008 | Masuo |
| 2009/0047104 A1* | 2/2009 | Jung .................... H05K 13/021 414/222.07 |
| 2009/0056114 A1 | 3/2009 | Kanai et al. |
| 2009/0293663 A1* | 12/2009 | Chang ................... B25J 9/0012 74/490.01 |
| 2013/0089396 A1 | 4/2013 | Bufano et al. |
| 2013/0108406 A1 | 5/2013 | Schaller et al. |
| 2014/0017048 A1 | 1/2014 | Mattern et al. |

FOREIGN PATENT DOCUMENTS

| | | | |
|---|---|---|---|
| JP | 2002354907 A | 12/2002 | |
| JP | 2010214563 A | 9/2010 | |
| JP | 2010240805 A * | 10/2010 | ............. B25J 15/06 |
| JP | 2013169640 A | 9/2013 | |
| KR | 20110078583 A | 7/2011 | |
| KR | 1020120120933 | 11/2012 | |
| TW | 200906578 A | 2/2009 | |
| WO | 2004046002 A2 | 6/2004 | |
| WO | 2004/068926 | 8/2004 | |
| WO | 2007058076 A1 | 5/2007 | |
| WO | 2010/024679 | 3/2010 | |
| WO | 2011079956 A1 | 7/2011 | |

\* cited by examiner

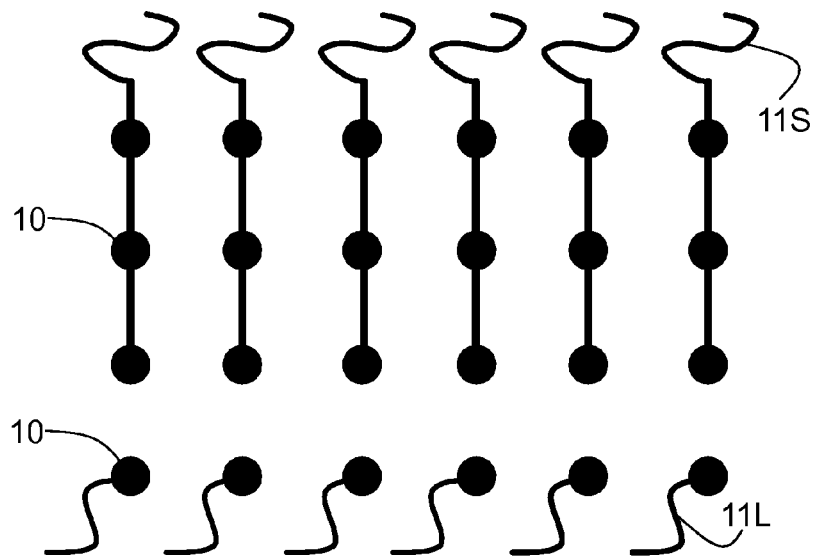
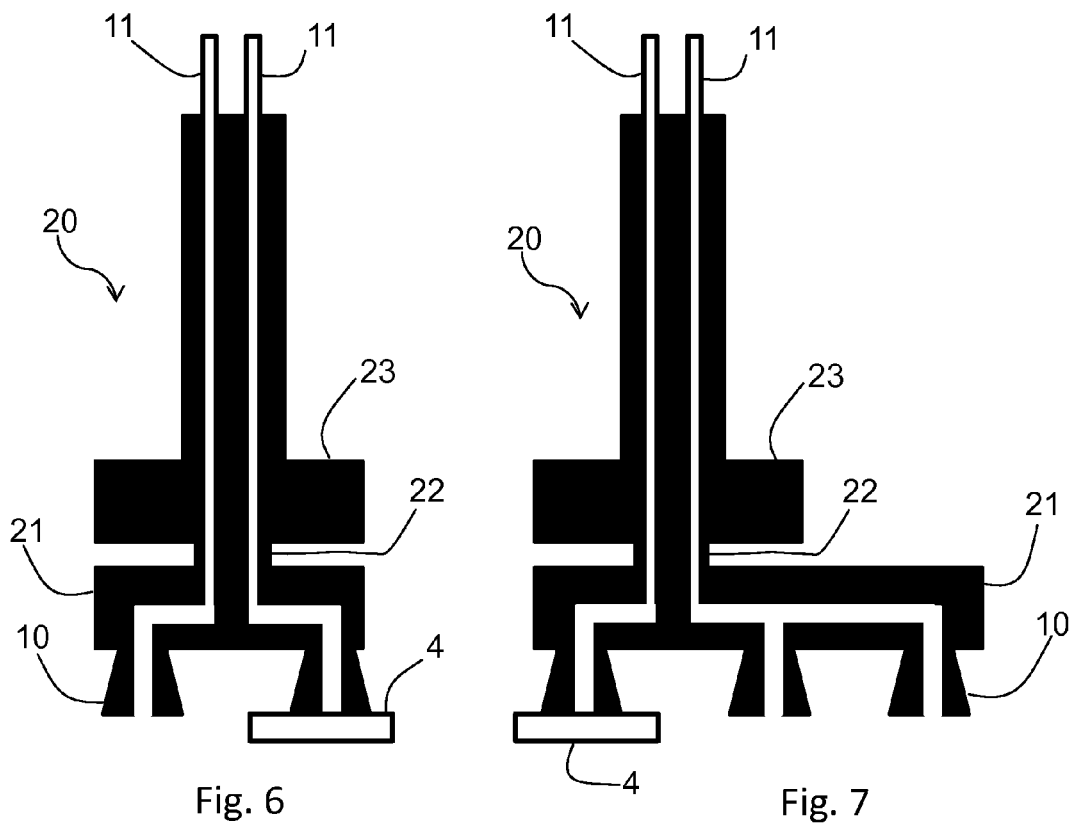
Fig. 5
Fig. 6
Fig. 7

PICK-AND-PLACE HEAD AND METHOD FOR PICKING WORK-PIECES

CROSS-REFERENCE TO RELATED APPLICATIONS

This application is filed under 35 U.S.C. §111(a) and §365(c) as a continuation of International Patent Application No. PCT/US2014/064841, filed on Nov. 10, 2014, which application claims the benefit of U.S. Provisional Patent Application No. 61/909,184, filed on Nov. 26, 2013, which applications are incorporated herein by reference in their entireties.

TECHNICAL FIELD

The present invention relates to a pick-and-place head for picking work-pieces from one location and placing them at a different location, as well as to a corresponding method. More specifically the present invention relates to a pick-and-place head and corresponding method wherein the picking of work-pieces is by action of a vacuum.

BACKGROUND OF THE INVENTION

Manufacturing of a product or assembly of some apparatus generally involves the handling of work-pieces, for example components to be assembled. In particular, these work-pieces need to be transported between different locations, like assembly stations, inspection stations, packaging stations, or transport means as they proceed through the manufacturing process. In modern automated or semi-automated manufacturing, such handling of work-pieces is usually done by robots. A large number of components may be handled in parallel. For example, electronic components are often transported in molded matrix carriers, for example JEDEC trays. The electronic components are situated in the pockets, or cells, of the trays. Placing components into the pockets or picking components from the pockets for transferring them to a different location, i.e. for inspection or assembly, is usually done by pick-and-place robots. A pick-and-place robot typically comprises one or several so-called grippers (or pickers) that can pick-up an electronic component from a pocket of a tray and also place an electronic component into a pocket of a tray. The gripper may be mechanically clamping the electronic component or, more commonly, be using vacuum nozzles.

In order to increase throughput, pick-and-place robots are often equipped with multiple grippers such that several components can be picked up or placed in parallel. Common configurations are pick-and-place heads that have enough grippers to pick up an entire row of components at the same time or in some cases two entire rows of components at the same time.

In a typical manufacturing process most pockets of a tray contain one component that can be picked up by a gripper. There are, however, usually also a few pockets per tray that are empty or pockets that contain an incorrectly placed component, e.g. tilted or rotated. From such pockets no components can be picked up and a vacuum nozzle that is placed above such a pocket will not attain vacuum. Conventional multi-nozzle/gripper pick-and-place robots using vacuum nozzles have therefore independent/individual vacuum/blow-off supply lines along with individual vacuum sensors for each nozzle such that if there is a nozzle at an empty pocket or at an incorrectly placed component, where no vacuum can be attained, other nozzles will not be affected but can pick up components by vacuum, hence, operate correctly.

That means that in order to increase the number of grippers or nozzles, the number of vacuum supplies and of vacuum sensors has to be increased as well. Additional hardware on the pick-and-place head increases the mass of the pick-and-place head. For high throughput, however, high accelerations are needed, hence, higher mass is undesirable, and besides also increases costs. And in particular when upgrading existing heads with additional nozzles, many parts of the head need to be modified or changed, especially so that the number of vacuum supplies and of vacuum sensors can be increased as required.

While the above has described a typical situation for handling electronic components using vocabulary current in that field, the problem shown in the above example is more general. Wherever large numbers of components or work-pieces, especially components of at least roughly the same geometry, need to be handled during manufacturing, robots, or more generally, pick-and-place devices, may be employed that can pick or place more than one component at once. Using vacuum applied to the work-pieces via nozzles for picking the work-pieces is a widespread concept. For placing a work-piece, or dropping a work-piece from a nozzle, the vacuum for the corresponding nozzle is cancelled, additionally a burst of gas, usually air, may be used to actively blow the work-piece from the nozzle.

As has already been indicated above, if a pick-and-place head is to be modified to change the number of nozzles it exhibits so that the number of work-pieces it can handle at once is changed, in typical pick-and-place heads major reconfigurations are required, as each nozzle has its separate vacuum supply, usually with corresponding vacuum sensor. Furthermore, providing separate vacuum supplies and vacuum sensors for each nozzle renders the configuration of the pick-and-place head quite complex.

SUMMARY OF THE INVENTION

The present invention comprises a pick-and-place head for transporting a plurality of work-pieces from at least one first location to at least one second location, the pick-and-place head having a plurality of nozzles with each nozzle configured to engage one of the plurality of work-pieces, at least one independent vacuum supply configured to attach to one nozzle of the plurality of nozzles, and, at least one shared vacuum supply configured to attach to at least two nozzles of the plurality of nozzles not attached to the at least one independent vacuum supply.

The present invention also comprises a pick-and-place head for transporting a plurality of work-pieces from at least one first location to at least one second location, the pick-and-place head having a plurality of nozzles with each nozzle configured to engage one of the plurality of work-pieces, the plurality of nozzles arranged in rows with at least a first and second row, a plurality of independent vacuum supplies with each configured to attach to each nozzle of the plurality of nozzles in the first row, a shared vacuum supply configured to attach to the second row of nozzles, a plurality of vacuum sensors configured to indicate whether or not a sufficient force is being applied to the plurality of work-pieces, wherein the shared vacuum supply and each of the plurality of independent vacuum supplies have one vacuum sensor.

The present invention also comprises a pick-and-place device having a pick-and-place head moveable by operation of the pick-and-place device, the pick-and-place head having a plurality of nozzles with each nozzle configured to engage one of a plurality of work-pieces by action of a vacuum, wherein at least one nozzle of the plurality of nozzles has an individual vacuum supply and at least two further nozzles of the plurality of nozzles have a shared vacuum supply.

The present invention also comprises a method for picking a plurality of work-pieces with a plurality of nozzles by action of a vacuum, for placing the work-pieces at a different location, the method including the steps of approaching at least one of the plurality of work-pieces with a respective nozzle, and generating a vacuum at each respective nozzle, wherein the generating step is achieved in at least one of the plurality of nozzles by an individual vacuum supply of the at least one of the plurality of nozzles and in at least two further nozzles of the plurality of nozzles by a shared vacuum supply of the at least two further nozzles.

The present invention also comprises a method for picking a plurality of work-pieces with a plurality of nozzles by action of a vacuum, for placing the work-pieces at a different location, wherein the plurality of work-pieces and the plurality of nozzles are arranged in respective rows, the nozzles of one first row of nozzles each having an individual vacuum supply, the nozzles of the remaining at least one second row of nozzles having a shared vacuum supply, the method including the steps of: a) positioning, by relative movement between the nozzles and the work-pieces, each row of nozzles above a row of work-pieces; b) attempting to pick up a respective work-piece with each nozzle; c) placing the picked-up work-pieces at a different location; d) verifying if work-pieces failed to be picked up in step b); e1) positioning the first row of nozzles over a verified work-piece that has been verified by step d) as being failed to be picked up; f1) picking up the verified work-piece with a nozzle of the first row of nozzles and placing the verified work-piece at the different location intended for it in step c); g1) repeating steps e1) and f1) until no verified work-pieces which failed to be picked up in step b) remain; e2) testing, if step d) does not indicate work-pieces that failed to be picked up, if at least as many rows of work-pieces remain to be picked up as there are rows of nozzles, and if so, repeat from step a), else consider any remaining rows of work-pieces as if they had failed to be picked up in step b) and proceed from step e1), picking up all the work-pieces in such a row with the nozzles in the first row of nozzles.

A general object of the present invention is to provide a pick-and-place head of simpler configuration, which can easily be reconfigured in order to change the number of work-pieces that can be handled at once, and which nonetheless provides for efficient and reliable handling of all the work-pieces to be processed.

Another object of the present invention is to provide a method for handling plural work-pieces at once in an efficient and reliable manner.

The object with regard to the pick-and-place head is achieved by a pick-and-place head for picking a plurality of work-pieces from at least one first location and for placing the plurality of work-pieces in at least one second location, the pick-and-place head exhibiting a plurality of nozzles, each nozzle of the plurality of nozzles configured to engage one of the plurality of work-pieces by action of a vacuum, wherein at least one nozzle of the plurality of nozzles has an individual vacuum supply and at least two further nozzles of the plurality of nozzles have a shared vacuum supply.

The object with regard to the method is achieved by a method for picking a plurality of work-pieces with a plurality of nozzles by action of a vacuum, for placing the work-pieces at a different location, the method including the steps of approaching at least one of the plurality of work-pieces with a respective nozzle and then starting generation of a vacuum at each respective nozzle, wherein generation of a vacuum in at least one of the plurality of nozzles is achieved by an individual vacuum supply of the at least one of the plurality of nozzles and generation of a vacuum in at least two further nozzles of the plurality of nozzles is achieved by a shared vacuum supply of the at least two further nozzles.

A pick-and-place head according to the invention exhibits a plurality of nozzles, each of which is configured to engage one of the plurality of work-pieces by action of a vacuum. According to the invention at least one nozzle of the plurality of nozzles has an individual vacuum supply and at least two further nozzles of the plurality of nozzles have a shared vacuum supply. An individual vacuum supply for a nozzle means that the vacuum supply for the nozzle is independent of the vacuum supply for different nozzles, and in particular implies that if a failure to achieve a sufficient degree of vacuum occurs at one or plural other nozzles of the pick-and-place head, this failure does not affect the nozzle with the individual vacuum supply. As at least two further nozzles have a shared vacuum supply, there is, obviously, no need for providing individual vacuum supplies for each of these further nozzles, thus leading to a simpler configuration of the pick-and-place head. A shared vacuum supply by itself, however, has one significant disadvantage. If a sufficient degree of vacuum is not achieved at one of the nozzles sharing a vacuum supply, this will also affect the vacuum at the other nozzles connected to the shared vacuum supply, usually leading to a breakdown of vacuum or failure to achieve a sufficient vacuum at these other nozzles. A failure to achieve vacuum at a single nozzle, affecting then all other nozzles connected to the common vacuum supply, for example occurs if a nozzle is to pick up a work-piece from a position where it is supposed to be, for example a specific pocket of a tray, but the work-piece is not there, i.e. not in the pocket, or is inadequately positioned relative to the nozzle so that it cannot properly seal the nozzle, preventing the build-up of a vacuum. An insufficient degree of vacuum in the shared vacuum supply will thus lead to a failure to pick up work-pieces, usually more work-pieces will not be picked up than just the absent, or inadequately positioned, one. According to the invention therefore the at least one nozzle with individual vacuum supply is provided. While this nozzle in normal operation of the pick-and-place head can be used to pick up work-pieces just as the other nozzles, if a failure of vacuum occurs in the shared vacuum supply, it can be used to pick up all those work-pieces which were not picked up as a result of the insufficient degree of vacuum in the shared vacuum supply. In this way it is ensured that all work-pieces are picked up. Reconfiguration of the pick-and-place head to change the number of nozzles is simpler than in typical heads, as instead of providing separate vacuum supplies, in the pick-and-place head according to the invention it is sufficient to connect nozzles to or disconnect nozzles from the shared vacuum supply.

In principle it is conceivable, and sufficient to achieve the object of the invention, that all nozzles but one are connected to a shared vacuum supply, and that only one nozzle has an individual vacuum supply. While this configuration is one configuration within the scope of the invention, many further configurations are possible within the scope of the invention.

In one embodiment, the nozzles are arranged in rows. Nozzles with individual vacuum supplies form a number L, where L is equal to or greater than one, of these rows. The remaining nozzles form a number S of rows, where S is equal to or greater than one. The nozzles in each of the S rows share a vacuum supply, but the vacuum supply of each such row is separate from the vacuum supply of all the other rows.

In a different embodiment, the nozzles also are arranged in rows. Nozzles with individual vacuum supplies form a number L, where L is equal to or greater than one, of these rows. The remaining nozzles form a number S of rows, where S is equal to or greater than one. All the nozzles in this number S of rows have a shared vacuum supply, i.e. they all are connected to a common vacuum supply.

In another embodiment, the nozzles are arranged in rows. At least one nozzle in each row has an individual vacuum supply, and all further nozzles of the respective row have a shared vacuum supply. Nozzles in different rows do not share a vacuum supply. In each of the preceding three embodiments, each row holds the same number of nozzles. As a variant of each of these embodiments, there are at least two rows of nozzles which differ between them as to the number of nozzles they hold.

In example embodiments, to each vacuum supply there corresponds a vacuum sensor. The vacuum sensor is configured to indicate whether sufficient vacuum for engaging the work-pieces has been attained or not. Sufficient vacuum has been attained, if the pressure in the interior of a nozzle is sufficiently below the environmental pressure so that the work-piece is pressed against the nozzle by the environmental pressure, countering the weight of the work-piece; otherwise the vacuum is insufficient. In this manner, in case of sufficient vacuum, a nozzle engages a work-piece. For known configuration of a nozzle and known weight and geometry of a work-piece, a threshold for a pressure difference between the pressure in the interior of the nozzle and the environmental pressure may be established. The vacuum in a vacuum supply, or corresponding nozzle, may then be deemed sufficient, if the pressure in the vacuum supply or nozzle, respectively, is further below the environmental pressure than indicated by the threshold. Otherwise the vacuum may be deemed insufficient. If the vacuum sensor indicates that sufficient vacuum has not been achieved, then appropriate measures can be taken. For example, nozzles with individual vacuum supplies can be employed to pick up work-pieces that were not picked up due to the insufficiency of vacuum in the shared vacuum supply.

In an example embodiment, the nozzles are located on at least one nozzle carrier mounted on the body of the pick-and-place head. The nozzle carrier is a separate element of the pick-and-place head and exhibits the nozzles of the pick-and-place head. The nozzle carrier can be connected with the rest of the pick-and-place head. In particular supply lines for the vacuum supply in the body of the pick-and-place head can be connected to corresponding lines in the nozzle carrier running to the nozzles and thus establishing lines for the vacuum supply of the nozzles. The pick-and-place head is configured such that the nozzle carrier is exchangeable for a nozzle carrier with a different number of nozzles. In particular, the supply lines for the vacuum supply within the body of the pick-and-place head are configured such that they can cooperate with nozzle carriers having different numbers of nozzles without changing the configuration in the body of the pick-and-place head. In specific embodiments the mounting of the nozzle carrier on the pick-and-place head is via an intermediate element, known as gripper body, which is connected to the pick-and-place head and contains a mount position for a nozzle carrier. Nozzle carrier and intermediate element, or gripper body, form a gripper. The gripper body may be moveable relative to the body of the pick-and-place head.

The pick-and-place head is moveable relative to the plurality of work-pieces. In an example embodiment of the above described type where the nozzles are arranged in rows the arrangement of the nozzles furthermore is such that as the pick-and-place head moves relative to the plurality of work-pieces the nozzles with individual vacuum supply follow the nozzles with shared vacuum supply. In this way work-pieces which failed to be picked up by nozzles with shared vacuum supply can be picked up most easily by the nozzles with individual vacuum supply without requiring additional reverse movements of the pick-and-place head. Such an arrangement of nozzles can be realized whether there is shared vacuum supply for each of a number of rows of nozzles or a vacuum supply shared by more than one row of nozzles.

As has already been mentioned, the invention can be advantageously employed where the work-pieces handled are electronic components. In particular the work-pieces, or electronic components, in embodiments are picked from at least one tray and placed at a processing station. The processing station may for instance perform assembly, inspection, or packaging of the work-pieces. The pick-and-place head according to the invention may also be used to pick the work-pieces at a processing station and place them into at least one tray.

A particular embodiment of the invention is a pick-and-place head for picking a plurality of work-pieces from at least one first location and for placing the plurality of work-pieces in at least one second location. The pick-and-place head exhibits a plurality of nozzles, each nozzle of the plurality of nozzles configured to engage one of the plurality of work-pieces by action of a vacuum. The nozzles are arranged in rows, wherein the nozzles of one first row each have an individual vacuum supply and the nozzles of at least one second row have a shared vacuum supply. A vacuum sensor corresponds to each vacuum supply, each vacuum sensor configured to indicate whether sufficient vacuum for engaging the work-pieces has been attained or not.

The method according to the invention, for picking a plurality of work-pieces with a plurality of nozzles by action of a vacuum, in order to place the work-pieces at a different location, includes the steps of approaching at least one of the plurality of work-pieces with a respective nozzle and starting generation of a vacuum at each respective nozzle. It should be noted that moving a pick-and-place head in order to engage a work-piece implies movement of all the nozzles of the pick-and-place head, even if in a specific situation there may be at least one nozzle which will have no work-piece to pick up.

According to the invention the generation of a vacuum in at least one of the plurality of nozzles is achieved by an individual vacuum supply of the at least one of the plurality of nozzles and generation of a vacuum in at least two further nozzles of the plurality of nozzles is achieved by a shared vacuum supply of the at least two further nozzles. The meanings of individual vacuum supply and shared vacuum supply have already been discussed above in the context of the pick-and-place head.

In an advantageous embodiment of the method, in case one or plural work-pieces fail to be picked up by nozzles with shared vacuum supply, because there is insufficient vacuum in the shared vacuum supply, such work-pieces can be picked up in a subsequent step by nozzles with an individual vacuum supply. In embodiments the generation of a vacuum in each vacuum supply, and therefore in the corresponding nozzles, is monitored by a vacuum sensor provided for each vacuum supply. Each vacuum sensor is configured to trigger an error signal, if a vacuum sufficient to engage work-pieces by the nozzles connected to its respective vacuum supply cannot be achieved.

In some embodiments of the method, the work-pieces are to be picked and placed with nozzles arranged in rows. Therein, in particular, each row may contain the same number of nozzles, but embodiments where there are at least two rows of nozzles which differ in the number of nozzles they contain are also considered within the scope of the invention. In either case, there is a number L, equal to or greater than one, of rows of nozzles in which each nozzle has an individual vacuum supply. The remaining nozzles, i.e. those not in the number L of rows just mentioned, are arranged in a number S, equal to or greater than one, of rows and have a shared vacuum supply. The shared vacuum supply may be common to all the nozzles in the number S of rows, or may be common only to the nozzles of each of the number S of rows, but separate from the vacuum supply of any different row. In these embodiments the method includes the steps of attempting to pick up a respective work-piece with each of the nozzles, then placing the picked up work-pieces at a different location, and picking up a work-piece which failed to be picked up by a nozzle having a shared vacuum supply with a nozzle having an individual vacuum supply. The step of attempting to pick up a work-piece with a nozzle involves moving the nozzles such that the work-piece or the work-pieces to be picked up are approached by a respective nozzle, contacting the work-piece(s) with the respective nozzle(s) and starting the generation of a vacuum in the respective nozzle(s) via the respective connected vacuum supplies. The attempt to pick up a work-piece can fail for various reasons: There may be no work-piece for at least one of the nozzles. In such case, the fact of not being able to pick up a non-existent work-piece as such does not constitute a failure, but if the respective nozzle is connected with a vacuum supply shared with other nozzles, then, as there is no work-piece to block the nozzle, there may not be sufficient vacuum generated in the shared vacuum supply for the other nozzles to pick up work-pieces. The same can occur, if there is a work-piece for each nozzle with a shared vacuum supply, but at least one of these work-pieces is misplaced so that it cannot fully block the nozzle, again leading to insufficient vacuum in the shared vacuum supply and thus also at the further nozzles connected with the shared vacuum supply. The nozzles in the rows of nozzles with individual vacuum supply, in addition to picking up work-pieces in a first step, can in a subsequent step or even plural subsequent steps pick up work-pieces that failed to be picked up by nozzles connected to a shared vacuum supply.

In a different embodiment, the nozzles are also arranged in rows. In each such row a number L, equal to or greater than one, of nozzles each have an individual vacuum supply and the remaining number S, equal to or greater than one, of nozzles in each row have a vacuum supply common to these S nozzles in each respective row, but separate from the vacuum supply of nozzles in any different row of nozzles. The method here includes the steps of attempting to pick up a respective work-piece with each of the nozzles, then placing the picked-up work-pieces at a different location, and picking up a work-piece which failed to be picked up by a nozzle having a shared vacuum supply, with a nozzle having an individual vacuum supply. The steps of the method correspond to the steps described for the preceding embodiments, the difference here is in the assignment of nozzles to shared vacuum supplies.

In a particular embodiment of the method according to the invention for picking a plurality of work-pieces with a plurality of nozzles by action of a vacuum, in order to place the work-pieces at a different location, the work-pieces and the nozzles are arranged in respective rows. The nozzles of one first row of nozzles each have an individual vacuum supply. The nozzles of the remaining at least one second row of nozzles have a shared vacuum supply. In this embodiment, the method is carried out as follows:

By relative movement between the nozzles and the work-pieces, each row of nozzles is positioned above a row of work-pieces. Next, an attempt is made to pick up a respective work-piece with each nozzle. The attempt can fail for reasons already discussed above. Work-pieces which have been picked up are then placed at a desired different location. The embodiment of the method also includes a step of verifying if work-pieces failed to be picked up in the attempt just mentioned. This can for example be achieved by vacuum sensors for the vacuum supplies of the nozzles. Insufficient vacuum detected in a shared vacuum supply will then trigger the steps described below with respect to the rows of work-pieces which the rows of nozzles corresponding to the shared vacuum supply with insufficient vacuum attempted to pick up.

In order to pick up work-pieces which failed to be picked up before, the first row of nozzles is positioned over a work-piece which failed to be picked up. The work-piece is then picked up with a nozzle of the first row of nozzles and placed at the desired different location. If more than one work-piece failed to be picked up from a specific row of work-pieces, which can easily occur if the shared vacuum supply for the row of nozzles intended to pick up the specific row of work-pieces failed to provide sufficient vacuum, then all such work-pieces can be picked up in one step by the first row of work-pieces. The first row of nozzles proceeds to pick up any work-pieces for which the attempt to pick them up failed, and to place those work-pieces at their respective desired locations. If this is completed or if there were no failed attempts to pick up work-pieces, it is tested whether at least as many rows of work-pieces remain to be picked up as there are rows of nozzles. If so, the rows of nozzles are advanced relative to the rows of work-pieces and the steps just described are repeated. In case of an insufficient number of rows of remaining work-pieces the remaining rows of work-pieces can for example be picked up with the nozzles of the first row of nozzles.

These and other objects, advantages and features of the present invention will be better appreciated by those having ordinary skill in the art in view of the following detailed description of the invention in view of the drawings.

BRIEF DESCRIPTION OF THE DRAWINGS

The nature and mode of operation of the present invention will now be more fully described in the following detailed description of the invention taken with the accompanying drawing figures, in which:

FIG. 5 is a schematic representation showing an arrangement of nozzles with shared and individual vacuum supplies according to a further embodiment of the invention;

FIG. 6 is a schematic representation showing a nozzle carrier with two nozzles having an individual vacuum supply, the nozzle carrier attached to an element of a pick-and-place head;

FIG. 7 is a schematic representation showing a nozzle carrier with one nozzle having an individual vacuum supply and two nozzles having a shared vacuum supply, the nozzle carrier attached to an element of a pick-and-place head;

DETAILED DESCRIPTION

Figure 1:
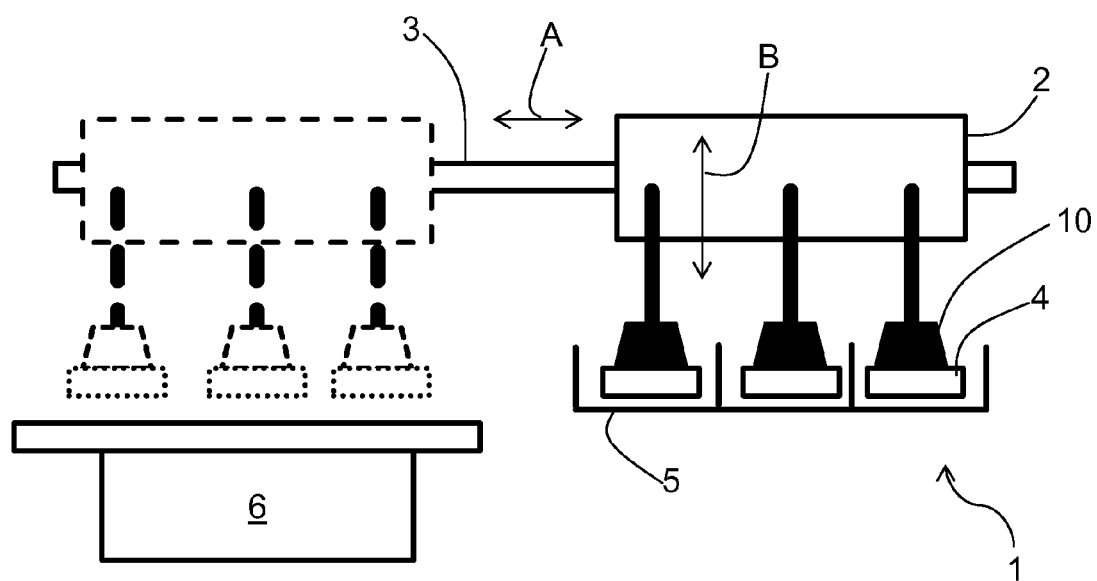
FIG. 1 is a schematic representation of a pick-and-place device with a pick-and-place head.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. Also, it is to be understood that the invention is not limited in its application to the details of construction and the arrangement of the components set forth in the following description or illustrated in the drawings. The invention is applicable to other embodiments or of being practiced or carried out in various ways and is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In the below description, an embodiment is an example or implementation of the invention. The various appearances of "one embodiment", "an embodiment", "certain embodiments" or "some embodiments" do not necessarily all refer to the same embodiments.

FIG. 1 shows pick-and-place device 1 having pick-and-place head 2. Pick-and-place head 2 is moveable, as indicated by double arrow A, along rail 3, in order to pick work-pieces 4 from tray 5 and place them at processing station 6. Pick-and-place head 2 with picked up work-pieces 4 is shown again in dashed lines in a position over processing station 6. Pick-and-place head 2 engages work-pieces 4 by nozzles 10. Nozzles 10 engage work-pieces 4 by action of a vacuum. In pick-and-place head 2 the nozzles are therefore connected to corresponding vacuum supplies (not shown in FIG. 1). In prior art, each nozzle has a separate vacuum supply. According to the invention, at least one nozzle 10 has a separate vacuum supply and at least two further nozzles 10 have a shared vacuum supply. In example embodiments, nozzles 10 can be moved in a direction, indicated by double arrow B, perpendicular to the direction indicated by double arrow A, in order to lift work-pieces out of the tray and also in order to place them onto processing station 6. In different embodiments, rail 3 may be moveable in the direction indicated by double arrow B. A pick-and-place head according to the invention can also be employed in pick-and-place devices of different configuration, for example, the pick-and-place head may be mounted on a robotic arm.

Figure 2:
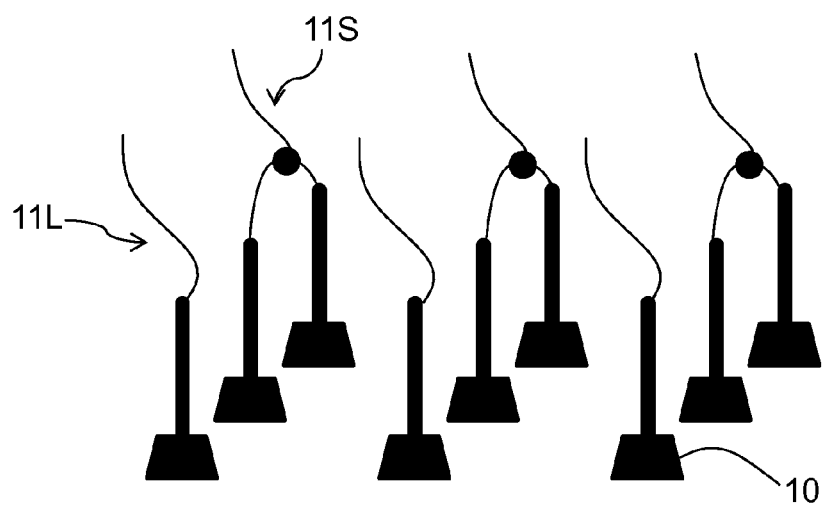
FIG. 2 is a schematic representation showing a plurality of nozzles with individual and shared vacuum supplies according to an embodiment of the invention.

FIG. 2 shows a plurality of nozzles 10. Some of nozzles 10 have an individual vacuum supply 11L, while further nozzles 10 have shared vacuum supply 11S. In particular, FIG. 2 shows three rows of three nozzles 10 each, wherein one nozzle 10 of each row has individual vacuum supply 11L, and the remaining two nozzles 10 of each row have shared vacuum supply 11S. In this embodiment there is no vacuum supply shared between rows of nozzles.

Figure 3:
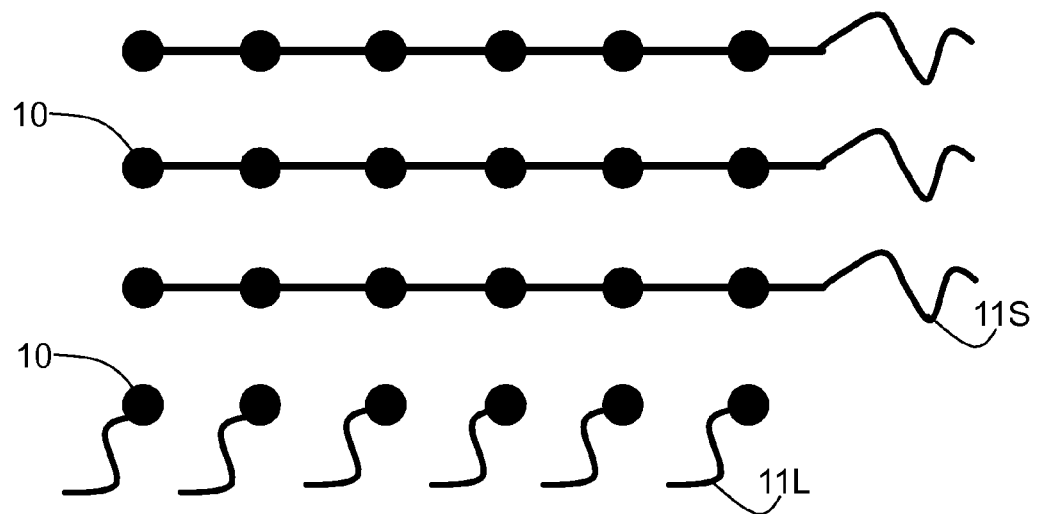
FIG. 3 is a schematic representation showing an arrangement of nozzles with shared and individual vacuum supplies according to an embodiment of the invention.

FIG. 3 is a schematic representation of nozzles 10, shown as filled black circles, and the connectivity of the vacuum supplies of nozzles 10. The vacuum supplies are shown as lines. More precisely, in FIG. 3 four rows of nozzles 10 are shown, each row containing six nozzles 10. The nozzles of one of the rows each have individual vacuum supply 11L, while for the remaining three rows of nozzles 10, each row has shared vacuum supply 11S, common to all nozzles 10 of the respective row, but separated from the vacuum supplies of all the other rows of nozzles 10.

Figure 4:
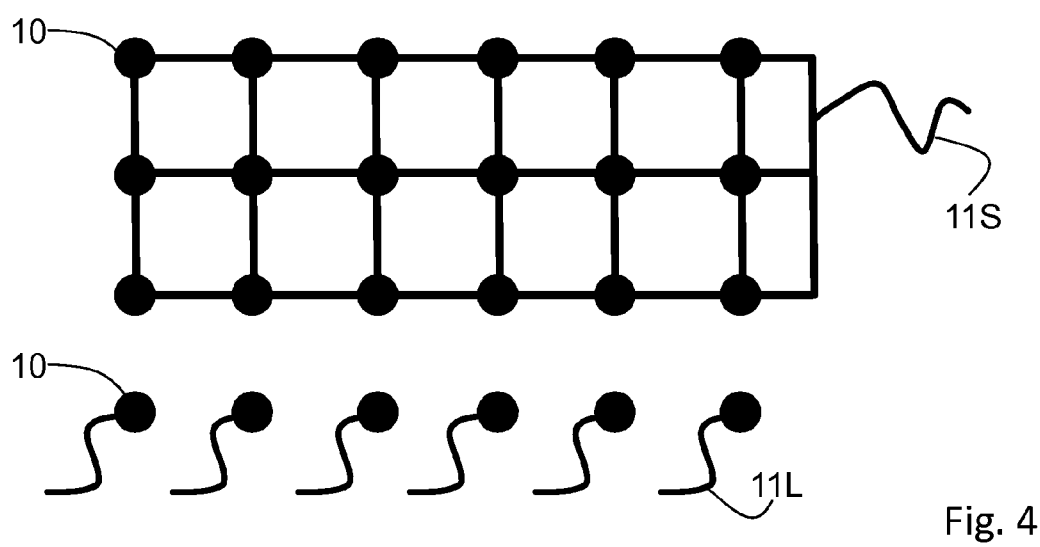
FIG. 4 is a schematic representation showing an arrangement of nozzles with shared and individual vacuum supplies according to a further embodiment of the invention.

FIG. 4 shows a different connectivity of the vacuum supply of nozzles 10, using the same schematic representation as FIG. 3. FIG. 4 shows four rows of nozzles 10, each row containing six nozzles 10. The nozzles of one of the rows each have individual vacuum supply 11L, while the remaining three rows of nozzles 10 have shared vacuum supply 11S, common to all nozzles 10 of the three rows.

FIG. 5 shows yet another connectivity scheme of the vacuum supply of nozzles 10, using the same schematic representation as FIG. 3. FIG. 5 shows six rows of nozzles 10, each row containing four nozzles 10. One nozzle 10 of each row has individual vacuum supply 11L, while the remaining three nozzles 10 of each row have shared vacuum supply 11S. No vacuum supplies are shared between rows.

For all embodiments, the vacuum supplies comprise pipes, tubes, channels ultimately connected to a known source of vacuum like one or plural pumps of known type, where the source of vacuum is configured to remove gas, in particular air, from the pipes, tubes, channels and thus also from the interior of nozzles 10 forming an end of the pipes, tubes, channels. If nozzle 10 is blocked by a work-piece, then no gas/air can enter the nozzle to replace the removed gas/air, and a vacuum is generated in the nozzle; in the context of the application generation of a vacuum means generation of a pressure of the gas/air lower than the environmental pressure. A sufficient degree of vacuum is achieved, if the pressure difference between the environmental pressure and the pressure in the nozzle is sufficient to counter the weight of a work-piece to be picked up, so that the work-piece is pressed against the nozzle.

FIG. 6 shows an element, often referred to as gripper 20, which exhibits nozzles 10 and by which nozzles 10 are attached to pick-and-place head 2 as shown in FIG. 1. In the embodiment shown, gripper 20 comprises nozzle carrier 21, also known as pitch adaptor, and gripper body 23, connected to nozzle carrier 21 by connection means 22. In pick-and-place head 2 ready for operation, gripper body 23 is mounted to the body of pick-and place head 2, which includes connecting each of channels 11 to a separate vacuum source. In the embodiment shown, nozzle carrier 21 can be detached from gripper body 23. When nozzle carrier 21 is attached to gripper body 23, connecting means 22 not only mechanically secures the connection between gripper body 23 and nozzle carrier 21, but also establishes a connection for channels 11 from gripper body 23 to nozzle carrier 21. In the embodiment shown, each channel 11 leads to one nozzle 10. As each channel 11 is connected to a separate vacuum source, as has been stated, each of the two nozzles 10 shown has an individual vacuum supply, which is established by one of channels 11, respectively. In the embodiment shown, nozzle carrier 23 may be exchanged for a different one.

FIG. 7 also shows gripper 20. The same gripper body 23 as shown in FIG. 6 is used, but by connecting means 22 a different nozzle carrier 23 is attached to gripper body 23. Nozzle carrier 21 of FIG. 7 exhibits three nozzles 10 instead of two, but, as can be seen from FIG. 7, the configuration of gripper body 23 has not changed. Still each of channels 11 is connected to a separate source of vacuum. By the configuration of nozzle carrier 21, one of channels 11 establishes an individual vacuum supply for one of nozzles 10, while the other channel 11 establishes a shared vacuum supply for the remaining two nozzles 10.

The gripper body of FIG. 6 and FIG. 7 may be configured such and mounted to pick-and-place head 2 in such a manner that it can be moved relative to the pick-and-place head along the direction indicated by double arrow B in FIG. 1. This configuration and mounting of gripper body 23 is independent of nozzle carrier 21 used, in particular of the number of nozzles 10 present on nozzle carrier 21. For placing FIGS. 6 and 7 into context, one nozzle 10 is shown with work-piece 4 engaged.

Figure 8:
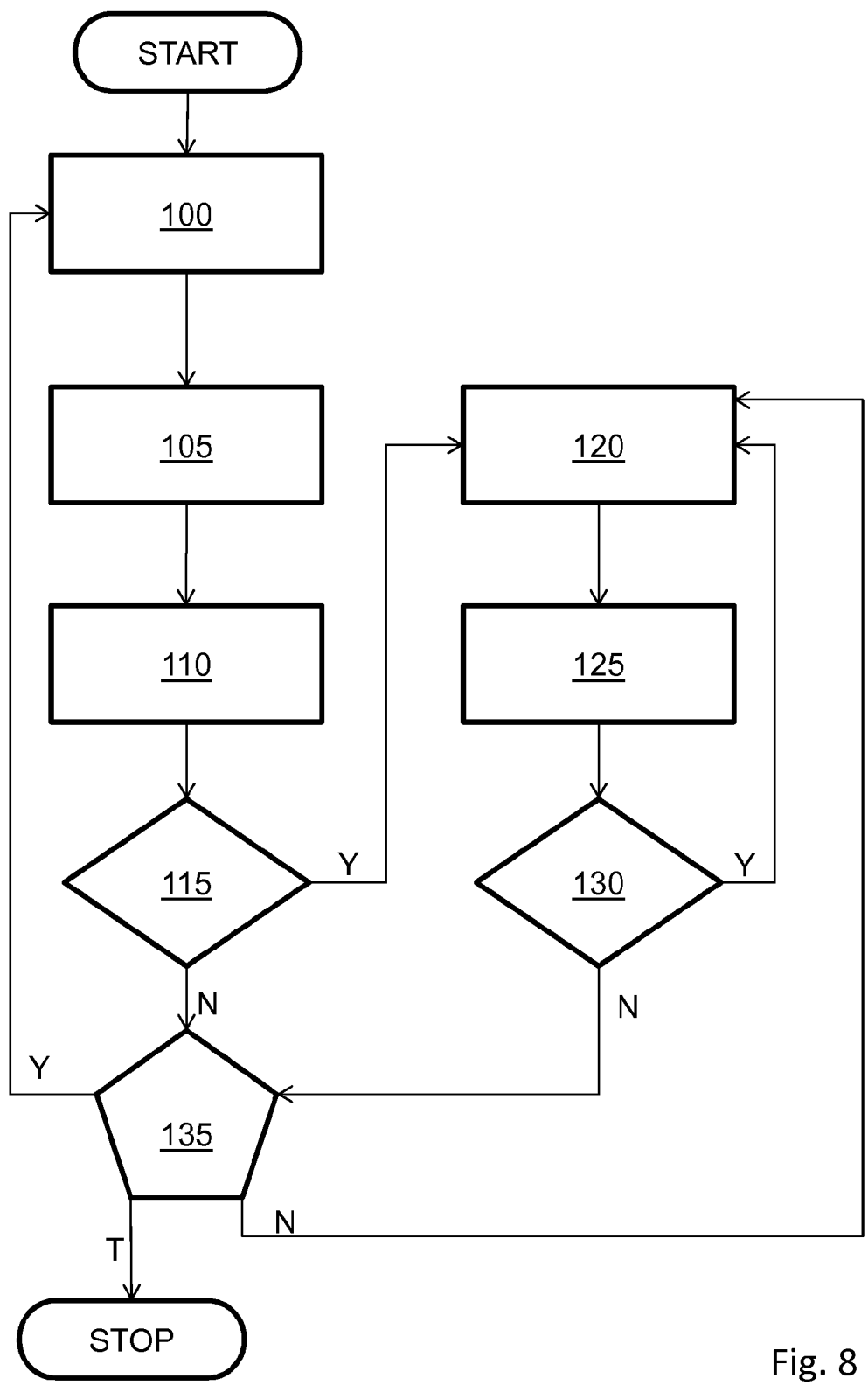
FIG. 8 is a flow diagram of an embodiment of the method to pick and place work-pieces; and, FIG. 9 is an illustration of an embodiment of the method, showing various steps of the picking of work-pieces.

FIG. 8 is a flow chart of a specific embodiment of the method according to the invention. In this embodiment, a pick-and-place head with three rows of nozzles is used, each row of nozzles having the same number of nozzles. The nozzles of a first one of the rows of nozzles each have an individual vacuum supply, and the nozzles of the remaining two rows have a shared vacuum supply. The description of the method provided by the flow chart applies both if the shared vacuum supply is connected between the two rows and if the vacuum supply is shared between the nozzles of the respective row only. Furthermore, the work-pieces are aligned in rows as well, the distance between subsequent rows of work-pieces corresponding to the distance between the rows of nozzles on the pick-and-place head used, so that three rows of work-pieces can be picked up at once. The pick-and-place head with the nozzles is moveable relative to the work-pieces, such that the row of nozzles with individual vacuum supplies, i.e. the first row of nozzles, follows the rows of nozzles with the shared vacuum supply.

In step 100, by relative movement between the pick-and-place head and the work-pieces, the three rows of nozzles are placed over three rows of work-pieces, one row of nozzles over one row of work-pieces, respectively. Usually, the nozzles are brought in contact with the work-pieces to be picked up.

In step 105, it is attempted to pick up the work-pieces over which nozzles are positioned, simultaneously in a single step, by starting the generation of a vacuum in the respective vacuum supply of each nozzle.

In step 110, the picked up work-pieces are placed at a desired different location, for example a processing station.

In step 115 it is checked whether there are any work-pieces which failed to be picked up in step 105. This checking can be done by any suitable means, for example the rows of work-pieces could be monitored by cameras and image processing could be used. Alternatively, each vacuum supply is provided with a vacuum sensor. Such a vacuum sensor is configured to trigger an error signal if only an insufficient vacuum is attained in its corresponding vacuum supply. The meaning of insufficient vacuum has been explained above. In such a case there will be work-pieces which failed to be picked up in step 105. If this is the case, branch 'Y' in FIG. 8, the method proceeds with step 120. If this is not the case, i.e. if there are no work-pieces which failed to be picked up in step 105, the method proceeds with step 135, branch 'N' from step 115.

In step 120, the first row of nozzles is positioned over a work-piece which failed to be picked up, i.e. it is positioned over the location a row of work-pieces, from which at least one work-piece failed to be picked up in step 105, occupied before step 105. In step 125, the at least one work-piece which failed to be picked up in step 105 is picked up with a nozzle from the first row of nozzles. If more than one work-piece from the respective row failed to be picked up in step 105, then all these work-pieces are picked up simultaneously by the nozzles of the first row of nozzles in one step. The picked up work-pieces are then placed at their corresponding desired different location.

In step 130, it is checked, whether any work-pieces which failed to be picked up in step 105 remain. This can in particular occur, if work-pieces from more than one row of work-pieces failed to be picked up in step 105. If this is the case, branch 'Y' from step 130, the method returns to step 120. If this is not the case, branch 'N' from step 130, the method proceeds with step 135.

If step 135 is reached, all work-pieces that were to be picked up in step 105 have been picked up and placed at their respective desired location, either directly by steps 105 and 110, or via additional steps 120 and 125. The method then can proceed to pick up any potential further rows of work-pieces.

In step 135, it is tested whether any rows of work-pieces remain. If no, branch 'T' from step 135, the method terminates. It is also tested whether at least as many rows of work-pieces remain to be picked up as there are rows of nozzles, i.e., at least three rows of work-pieces in the specific embodiment described here, and if so, branch 'Y' from step 135, the pick-and-place head is advanced by three rows of work-pieces, to repeat the steps of the method from step 100. If fewer rows of work-pieces, i.e., fewer than three rows of work-pieces in the specific embodiment described, remain, any remaining rows of work-pieces can be picked up by the nozzles of the first row, as if they had failed to be picked up in step 105; therefore, in this case, the method will consider the remaining rows of work-pieces as if they had failed to be picked up and proceed with step 120, branch 'N' from step 135.

Figure 9:
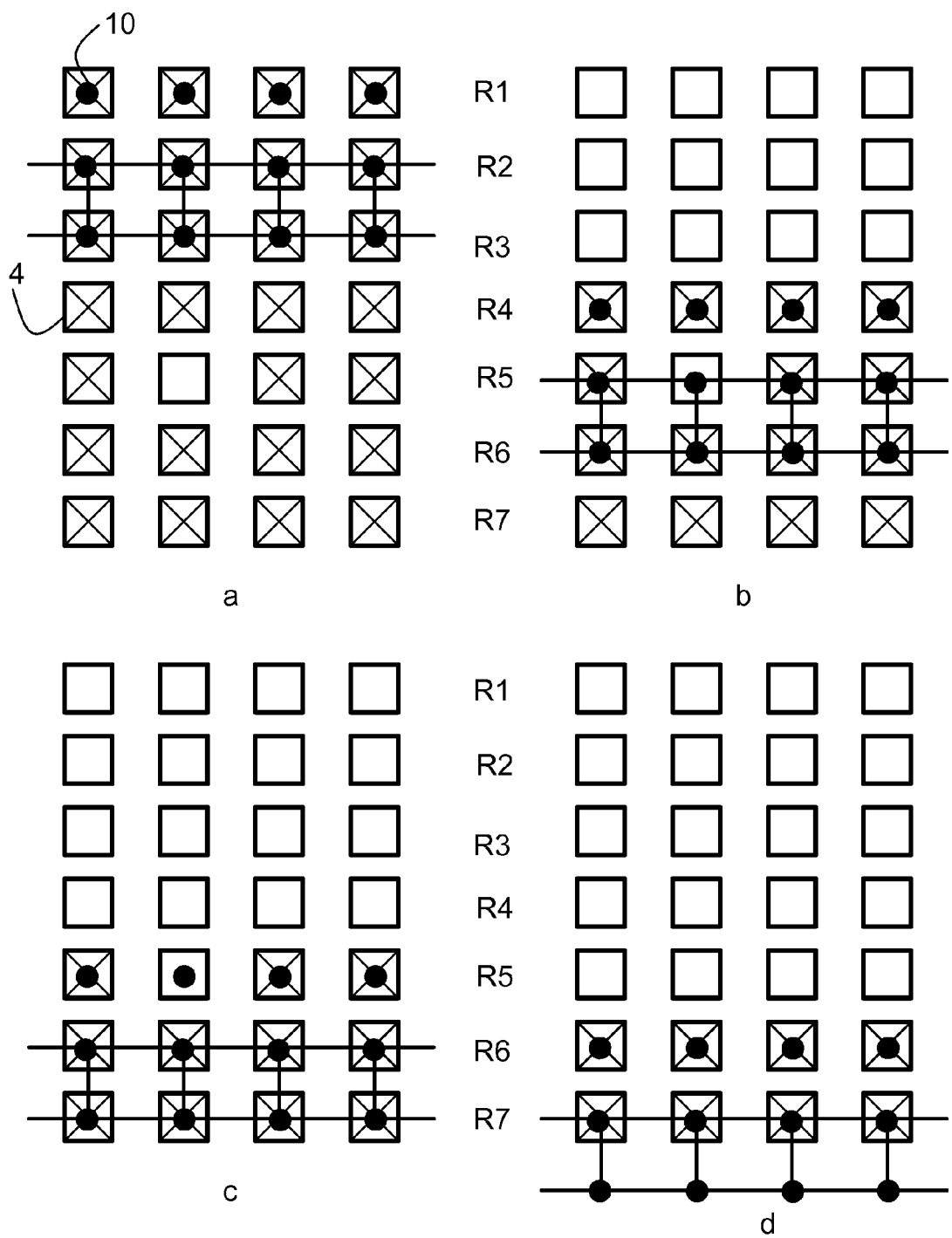

FIG. 9 illustrates the method by showing rows of work-pieces at various stages of the method. The stages are indicated, in the order they occur in the method, by letters a, b, c, and d. As in FIGS. 3, 4, and 5, filled dots indicate nozzles 10, lines between nozzles indicate a shared vacuum supply. For ease of reference, the rows of work-pieces are named R1, R2, R3, R4, R5, R6, and R7. Crossed squares indicate work-piece 4, while empty squares indicate a position in a row which could be occupied by a work-piece, but is empty, or a position where a work-piece is misplaced.

At the start, stage a, rows R1, R2, and R3 are to be picked by nozzles 10, row R1 is to be picked by nozzles 10 with individual vacuum supply, while rows R2 and R3 are picked by the nozzles with shared vacuum supply. All positions in rows R1, R2, R3 are occupied by correctly placed work-pieces, so all work-pieces can be picked up simultaneously, and then placed at their desired location elsewhere, for instance an inspection or assembly station. The positions the work-pieces occupied in the rows here then are empty. Depending on the manufacturing process, it is possible that after a step, like inspection, for which the work-pieces were picked from the rows, they are placed back into the rows, before the next rows of work-pieces are picked. In this case, the positions in rows R1, R2, R3 would not be empty, but occupied again. The method moves to stage b. The rows of nozzles 10 are advanced by three rows of work-pieces, so thin at stage b rows R4, R5, and R6 are to be picked, more precisely row R4 by the row of nozzles 10 with individual vacuum supply, rows R5 and R6 with the rows of nozzles 10 with shared vacuum supply.

All work-pieces in row R4 can be picked by the nozzles with individual vacuum supply. In row R5, however, there is an empty position. In the shared vacuum supply, due to the empty position in row R5, no sufficient vacuum can be obtained, as the corresponding nozzle over the empty position is not sealed by a work-piece. In this example, the insufficient vacuum results in all the work-pieces of rows R5 and R6 not being picked. The work-pieces picked by the nozzles with individual vacuum supplies, i.e. those work-pieces picked from row R4, are placed at their desired location. The method then proceeds to stage c.

In stage c, the rows of nozzles with individual vacuum supplies are placed over row R5. The nozzles with individual vacuum supplies pick up the three work-pieces in row R5. The fact that due to the missing work-piece no sufficient vacuum can be obtained in one of the nozzles operating on row R5 does not affect the vacuum in the other nozzles, precisely because their vacuum supplies are independent of each other. Depending on how the pick-and-place head is operated, in stage c, as rows R6 and R7 are complete, i.e. no work-pieces are missing, these rows could also be picked up at this step, and the work-pieces from rows R5, R6, and R7 could be placed at their desired location. The method then would stop, as all work-pieces have been transferred to a different location. Alternatively, and corresponding to the embodiment of the method discussed in the context of FIG. 8, the method, at stage c, could proceed to pick up only the work-pieces from row R5 and place them at their desired location. The method could then proceed to pick up the work-pieces in the remaining rows R6 and R7 by the nozzles with individual vacuum supply only.

In the latter alternative, the method proceeds to step d, in order to pick the work-pieces from row R6, which will be placed at their desired location. After the obvious and not shown operation of moving the nozzles with individual vacuum supplies to row R7 and repeating the picking and placing with the work-pieces of row R7, the method has finished, all work-pieces from rows R1 to R7 have been transferred to the desired location.

The invention is not limited to those diagrams or to the corresponding descriptions. For example, flow need not move through each illustrated box or state, or in exactly the same order as illustrated and described.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

What is claimed is:

1. A pick-and-place head for transporting a plurality of work-pieces from at least one first location to at least one second location, the pick-and-place head comprising:
   a plurality of nozzles with each nozzle configured to contact and engage one of the plurality of work-pieces;
   at least one independent vacuum supply configured to attach to one nozzle of the plurality of nozzles by an independent vacuum supply tube; and,
   a shared vacuum supply configured to attach to at least two nozzles of the plurality of nozzles by a shared vacuum supply tube not attached to the at least one independent vacuum supply, wherein the shared vacuum supply is a single vacuum pump.

2. The pick-and-place head of claim 1, further comprising a plurality of independent vacuum supplies, wherein:
   the shared vacuum supply includes at least one shared vacuum supply;
   the plurality of nozzles are arranged in rows;
   each nozzle in a number L of rows are connected to one of the plurality of independent vacuum supplies;
   each nozzle in each of a number S of rows are connected to the at least one shared vacuum supply separate from further shared vacuum supplies of further rows of nozzles, and
   the number L is greater than or equal to one and the number S is greater than or equal to one.

3. The pick-and-place head of claim 2, wherein the pick-and-place head is moveable relative to the plurality of work-pieces, and the arrangement of the rows of nozzles on the pick-and-place head is such that as the pick-and-place head moves over the plurality of work-pieces in a defined direction, the number L of rows having an individual vacuum supply follow the number S of rows having a shared vacuum supply.

4. The pick-and-place head of claim 1, further comprising a plurality of independent vacuum supplies, wherein:
   the shared vacuum supply includes at least one shared vacuum supply;
   the plurality of nozzles are arranged in rows;
   each nozzle in a number L of rows are connected to one of the plurality of independent vacuum supplies;
   each nozzle in a number S of rows are connected to the at least one shared vacuum supply common to all nozzles in the number S of rows; and,
   the number L is greater than or equal to one, and wherein the number S is greater than or equal to one.

5. The pick-and-place head of claim 4, wherein the pick-and-place head is moveable relative to the plurality of work-pieces, and the arrangement of the rows of nozzles on the pick-and-place head is such that as the pick-and-place head moves over the plurality of work-pieces in a defined direction the number L of rows having an individual vacuum supply follow the number S of rows having a shared vacuum supply.

6. The pick-and-place head of claim 1, further comprising a plurality of independent vacuum supplies, wherein:
   the shared vacuum supply includes at least one shared vacuum supply;

the plurality of nozzles are arranged in rows; and
at least one nozzle in each row is connected to one of the plurality of individual vacuum supplies and all further nozzles of the respective row are connected to the at least one shared vacuum supply.

7. The pick-and-place head of claim 1, wherein the shared vacuum supply includes at least one shared vacuum supply, the pick-and-place head further comprising a plurality of vacuum sensors configured to indicate whether or not a sufficient force is being applied to the plurality of work-pieces, wherein each of the at least one independent vacuum supply and the at least one shared vacuum supply have one vacuum sensor.

8. The pick-and-place head of claim 1, wherein the plurality of nozzles are located on at least one nozzle carrier mounted to a body of the pick-and-place head, and wherein the pick-and-place head is configured such that the nozzle carrier is exchangeable for another nozzle carrier with a different number of nozzles, with such an exchange not requiring a change to the vacuum supply within the body of the pick-and-place head.

9. The pick-and-place head of claim 1, wherein the plurality of work-pieces are electronic components.

10. The pick-and-place head of claim 1, wherein the plurality of work-pieces are picked from at least one tray and placed at a processing station and/or picked at a processing station and placed onto at least one tray.

11. A pick-and-place head for transporting a plurality of work-pieces from at least one first location to at least one second location, the pick-and-place head comprising:
a plurality of nozzles with each nozzle configured to contact and engage one of the plurality of work-pieces, the plurality of nozzles arranged in rows with at least a first and second row;
a plurality of independent vacuum supplies with each configured to attach to each nozzle of the plurality of nozzles in the first row by an independent vacuum supply tube;
a shared vacuum supply configured to attach to the second row of nozzles by a shared vacuum supply tube;
a plurality of vacuum sensors configured to indicate whether or not a sufficient force is being applied to the plurality of work-pieces, wherein:
the shared vacuum supply and each of the plurality of independent vacuum supplies have one vacuum sensor; and,
the shared vacuum supply is a single vacuum pump.

12. A pick-and-place device, comprising:
a pick-and-place head moveable by operation of the pick-and-place device, the pick-and-place head having a plurality of nozzles with each nozzle configured to contact and engage one of a plurality of work-pieces by action of a vacuum, wherein:
at least one nozzle of the plurality of nozzles has an individual vacuum supply and an independent vacuum supply tube, and at least two further nozzles of the plurality of nozzles have a shared vacuum supply and a shared vacuum supply tube; and,
the shared vacuum supply is a single vacuum pump.

13. A method for picking a plurality of work-pieces with a plurality of nozzles by action of a vacuum, for placing the work-pieces at a different location, the method comprising the steps of:
approaching each respective single work-piece included in the plurality of work-pieces with a single respective nozzle of the plurality of nozzles;
generating a vacuum at each respective nozzle; and,
picking up each respective single work-piece with said each respective nozzle, wherein the generating step is achieved in at least one of the plurality of nozzles by an individual vacuum supply of the at least one of the plurality of nozzles and in at least two further nozzles of the plurality of nozzles by a shared vacuum supply of the at least two further nozzles.

14. The method of claim 13, wherein a work-piece failing to be picked up by one of the at least two further nozzles having the shared vacuum supply is subsequently picked up by one of the at least one of the plurality of nozzles having the individual vacuum supply.

15. The method of claim 13, wherein the generating step is monitored by a vacuum sensor provided for each vacuum supply, and an error signal is triggered, if in one of the vacuum supplies a vacuum sufficient to engage work-pieces by the nozzles connected to the vacuum supply cannot be achieved.

16. The method of claim 13, wherein the plurality of nozzles are arranged in rows, the nozzles in a number L of rows each having a respective individual vacuum supply, the number L being greater than or equal to one, and the nozzles in the remaining number S of rows having the shared vacuum supply common to all the nozzles in the number S of rows, the number S being greater than or equal to one, the method comprising the steps of:
a) attempting to pick up a respective work-piece with each of the nozzles;
b) placing the picked-up work-pieces at a different location; and,
c) picking up a work-piece which, in step a), failed to be picked up by a nozzle having the shared vacuum supply, with a nozzle having the respective individual vacuum supply.

17. The method of claim 13, wherein the plurality of nozzles are arranged in rows, the nozzles in a number L of rows each having an individual vacuum supply, the number L being greater than or equal to one, and the nozzles in each of the remaining number S of rows having a shared vacuum supply, separate from the vacuum supply of any different row of nozzles, the number S being greater than or equal to one, the method comprising the steps of:
a) attempting to pick up a respective work-piece with each of the nozzles;
b) placing the picked-up work-pieces at a different location; and,
c) picking up a work-piece which, in step a), failed to be picked up by a nozzle having the shared vacuum supply, with a nozzle having the individual vacuum supply.

18. The method of claim 13, wherein the plurality of nozzles are arranged in rows, a number L of nozzles in each row each having an individual vacuum supply and the remaining number S of nozzles in each row having a vacuum supply common to these S nozzles but separate from the vacuum supply of nozzles in any different row of nozzles, the number L being greater than or equal to one, the number S being greater than or equal to one, the method comprising the steps of:
a) attempting to pick up a respective work-piece with each of the nozzles;
b) placing the picked-up work-pieces at a different location; and,
c) picking up a work-piece which, in step a), failed to be picked up by a nozzle having the shared vacuum supply, with a nozzle having the individual vacuum supply.

19. A method for picking a plurality of work-pieces with a plurality of nozzles by action of a vacuum, for placing the work-pieces at a different location, wherein the plurality of work-pieces and the plurality of nozzles are arranged in respective rows, the nozzles of one first row of nozzles each having an individual vacuum supply, the nozzles of the remaining at least one second row of nozzles having a shared vacuum supply, the method comprising the steps of:
- a) positioning, by relative movement between the nozzles and the work-pieces, each row of nozzles above a row of work-pieces;
- b) attempting to pick up a respective work-piece with each nozzle;
- c) placing the picked-up work-pieces at a different location;
- d) verifying if work-pieces failed to be picked up in step b);
- e1) positioning the first row of nozzles over a verified work-piece that has been verified by step d) as being failed to be picked up;
- f1) picking up the verified work-piece with a nozzle of the first row of nozzles and placing the verified work-piece at the different location intended for it in step c);
- g1) repeating steps e1) and f1) until no verified work-pieces which failed to be picked up in step b) remain;
- e2) testing, if step d) does not indicate work-pieces that failed to be picked up, if at least as many rows of work-pieces remain to be picked up as there are rows of nozzles, and if so, repeat from step a), else consider any remaining rows of work-pieces as if they had failed to be picked up in step b) and proceed from step e1), picking up all the work-pieces in such a row with the nozzles in the first row of nozzles.

20. A pick-and-place head for transporting a plurality of work-pieces from at least one first location to at least one second location, the pick-and-place head comprising:
- a plurality of nozzles arranged in first and second rows, wherein each nozzle is configured to engage one of the plurality of work-pieces;
- respective independent vacuum supply configured to attach to each nozzle in the first row of nozzles;
- at least one vacuum sensor; and,
- a shared vacuum supply configured to attach to the second row of nozzles, wherein:
  the plurality of work-pieces are arranged in rows, and,
  the pick-and-place head is arranged to:
  - a. position, by relative movement between the nozzles and the work-pieces, each row of nozzles above a row of work-pieces;
  - b. attempt to pick up a respective work-piece with each nozzle;
  - c. place the picked-up work-pieces at a different location;
  - d. verify, using the at least one vacuum sensor, if work-pieces failed to be picked up;
  - e. position the first row of nozzles over a verified work-piece that has been verified as being failed to be picked up;
  - f. pick up the verified work-piece with a nozzle of the first row of nozzles and placing the verified work-piece at the different location;
  - g. repeat positioning the first row of nozzles over a verified work-piece that has been verified as being failed to be picked up and picking up the verified work-piece with a nozzle of the first row of nozzles and placing the verified work-piece at the different location until no verified work-pieces which failed to be picked up remain; and,
  - testing, if step d) does not indicate work-pieces that failed to be picked up, if at least as many rows of work-pieces remain to be picked up as there are rows of nozzles, and if so, repeat from step a), else consider any remaining rows of work-pieces as if they had failed to be picked up in step b) and proceed from step e), picking up all the work-pieces in such a row with the nozzles in the first row of nozzles.

21. The pick-and-place head of claim 20, wherein the shared vacuum supply includes at least one pump.

22. A pick-and-place device, comprising:
a pick-and-place head moveable by operation of the pick-and-place device, the pick-and-place head having first and second pluralities of nozzles, with each nozzle configured to contact and engage one of a plurality of work-pieces by action of a vacuum, wherein:
- each nozzle in the first plurality of nozzles has a respective individual vacuum supply and an independent vacuum supply tube;
- the first plurality of nozzles is arranged in a first number of rows;
- the second plurality of nozzles is arranged in a second number of rows, separate from the first number of rows; each row included in the second number of rows has a respective individual shared vacuum supply and a shared vacuum supply tube; and,
- each respective individual shared vacuum supply is a respective single vacuum pump.

23. A pick-and-place device, comprising:
a pick-and-place head moveable by operation of the pick-and-place device, the pick-and-place head having first and second plurality of nozzles, with each nozzle configured to contact and engage one of a plurality of work-pieces by action of a vacuum, wherein:
- each nozzle in the first plurality of nozzles has a respective individual vacuum supply and an independent vacuum supply tube;
- the first plurality of nozzles is arranged in a first number of rows;
- the second plurality of nozzles is arranged in first and second rows, separate from the first number of rows;
- the first and second rows have shared vacuum supply separate from any other vacuum supply and a shared vacuum supply tube; and,
- the shared vacuum supply is a single vacuum pump.

24. A pick-and-place head for transporting a plurality of work-pieces from at least one first location to at least one second location, the pick-and-place head comprising:
- first and second pluralities of nozzles with each nozzle configured to contact and engage one of the plurality of work-pieces; and,
- a respective independent vacuum supply configured to attach to each nozzle of the first plurality of nozzles by an independent vacuum supply tube, wherein:
  - the second plurality of nozzles is arranged in first, second and third rows; and,
  - each of the first, second and third rows has a respective individual shared vacuum supply and a respective shared vacuum supply tube, and each respective individual shared vacuum supply is a respective single vacuum pump.

25. A pick-and-place head for transporting a plurality of work-pieces from at least one first location to at least one second location, the pick-and-place head comprising:

a plurality of nozzles with each nozzle configured to contact and engage one of the plurality of work-pieces, the plurality of nozzles arranged in rows with at least a first and second row;

a plurality of independent vacuum supplies, with each independent vacuum supply configured to attach to a respective nozzle of the plurality of nozzles in the first row by an independent vacuum supply tube;

a shared vacuum supply configured to attach to the second row of nozzles by a shared vacuum supply tube; and, a single vacuum sensor configured to indicate whether or not a sufficient force is being applied to the plurality of work-pieces, wherein:

the shared vacuum supply is a single vacuum pump;

the shared vacuum supply and each of the plurality of independent vacuum supplies have the single vacuum sensor; and, at least one nozzle in the first row is arranged to pick up a work-piece failed to be picked up by nozzles in the second row.

26. A pick-and-place head for transporting a plurality of work-pieces from at least one first location to at least one second location, the pick-and-place head comprising:

a plurality of nozzles with each nozzle configured to contact and engage one of the plurality of work-pieces, the plurality of nozzles arranged in rows with at least a first, second, and third row;

a plurality of independent vacuum supplies, with each independent vacuum supply configured to attach to a respective nozzle of the plurality of nozzles in the first row by an independent vacuum supply tube;

a first shared vacuum supply configured to attach to only the second row of nozzles by a first shared vacuum supply tube;

a second shared vacuum supply configured to attach to only the third row of nozzles by a second shared vacuum supply tube; and, a plurality of vacuum sensors configured to indicate whether or not a sufficient force is being applied to the plurality of work-pieces, wherein the first shared vacuum supply is a single vacuum pump.

27. The pick-and-place head of claim 26, wherein:
the second shared vacuum supply includes a pump.

28. A method for picking a plurality of work-pieces with a plurality of nozzles by action of a vacuum, for placing the work-pieces at a different location, the method comprising the steps of:

approaching each respective single work-piece included in the plurality of work-pieces with each respective nozzle included in the plurality of nozzles;

generating, with an individual vacuum supply, a vacuum at a first nozzle;

generating, with a shared vacuum supply, a vacuum at second and third nozzles; and, picking up each of the respective single work-pieces with the first, second and third nozzles, respectively.

29. The method of claim 28, wherein the shared vacuum supply is a single vacuum pump.

30. A method for picking a plurality of work-pieces with a first plurality of nozzles and with a second plurality of nozzles arranged in first and second rows, by action of a vacuum, for placing the work-pieces at a different location, the method comprising the steps of:

approaching each respective single work-piece included in the plurality of work-pieces with each respective nozzle included in the first plurality of nozzles or with each respective nozzle included in the second plurality of nozzles;

generating, with an individual vacuum supply, a vacuum at each nozzle included in the first plurality of nozzles;

generating, with a shared vacuum supply, a vacuum at the second plurality of nozzles; and, picking up each of the respective single work-pieces with the respective nozzles included in the first plurality of nozzles or with each respective nozzle included in the second plurality of nozzles.

31. The method of claim 30, wherein the shared vacuum supply is a single vacuum pump.

32. A method for picking a plurality of work-pieces with a first plurality of nozzles and with a second plurality of nozzles arranged in first, second, and third rows, by action of a vacuum, for placing the work-pieces at a different location, the method comprising the steps of:

approaching each respective single work-piece included in the plurality of work-pieces with each respective nozzle included in the first plurality of nozzles or with each respective nozzle included in the second plurality of nozzles;

generating, with an individual vacuum supply, a vacuum at each nozzle included in the first plurality of nozzles;

generating, with a shared vacuum supply, a vacuum at the second plurality of nozzles; and, picking up each of the respective single work-pieces with the respective nozzles included in the first plurality of nozzles or with each of the respective nozzles included in the second plurality of nozzles.

33. The method of claim 32, wherein the shared vacuum supply is a single vacuum pump.

* * * * *